United States Patent [19]
Filippi

[11] Patent Number: 5,433,041
[45] Date of Patent: Jul. 18, 1995

[54] PREASSEMBLED OPERATING PANEL FOR VEHICLE DOORS

[75] Inventor: Aldo Filippi, Turin, Italy

[73] Assignee: Roltra Morse S.p.A., Rivoli, Italy

[21] Appl. No.: 36,138

[22] Filed: Mar. 24, 1993

[30] Foreign Application Priority Data

Mar. 24, 1992 [IT] Italy ............... TO92A0256

[51] Int. Cl.⁶ .................................. B60J 5/04
[52] U.S. Cl. ........................ 49/502; 49/349
[58] Field of Search ............ 49/502, 503, 349, 350, 49/351

[56] References Cited

U.S. PATENT DOCUMENTS

| | | | |
|---|---|---|---|
| 3,490,174 | 1/1970 | Schonberger | 49/351 X |
| 4,550,529 | 11/1985 | Drouillard | 49/351 X |
| 4,648,208 | 3/1987 | Baldamus et al. | 49/502 |
| 4,662,115 | 5/1987 | Ohya et al. | 49/502 |
| 4,785,585 | 11/1988 | Grier et al. | 49/502 |
| 4,800,638 | 1/1989 | Herringshaw et al. | 49/502 X |
| 4,974,365 | 12/1990 | Ono | 49/502 |
| 5,062,240 | 11/1991 | Brusasco | 49/502 X |
| 5,090,158 | 2/1992 | Bertolini | 49/502 |
| 5,095,659 | 3/1993 | Benoit et al. | |

FOREIGN PATENT DOCUMENTS 0385823 9/1990 European Pat. Off. .
0427153 5/1991 European Pat. Off. .
3217640 11/1983 Germany .

*Primary Examiner*—Jerry Redman
*Attorney, Agent, or Firm*—Wolf, Greenfield & Sacks

[57] ABSTRACT

On a vehicle door, a preassembled operating panel, housed inside the hollow bottom portion of the door, presents door lock mechanisms, a device for regulating and guiding the sliding window of the door, and a central load-bearing element consisting at least partly of a portion of the window regulating device and having elements for connecting the operating panel to the door; the door lock mechanisms being fitted to the central load-bearing element.

23 Claims, 1 Drawing Sheet

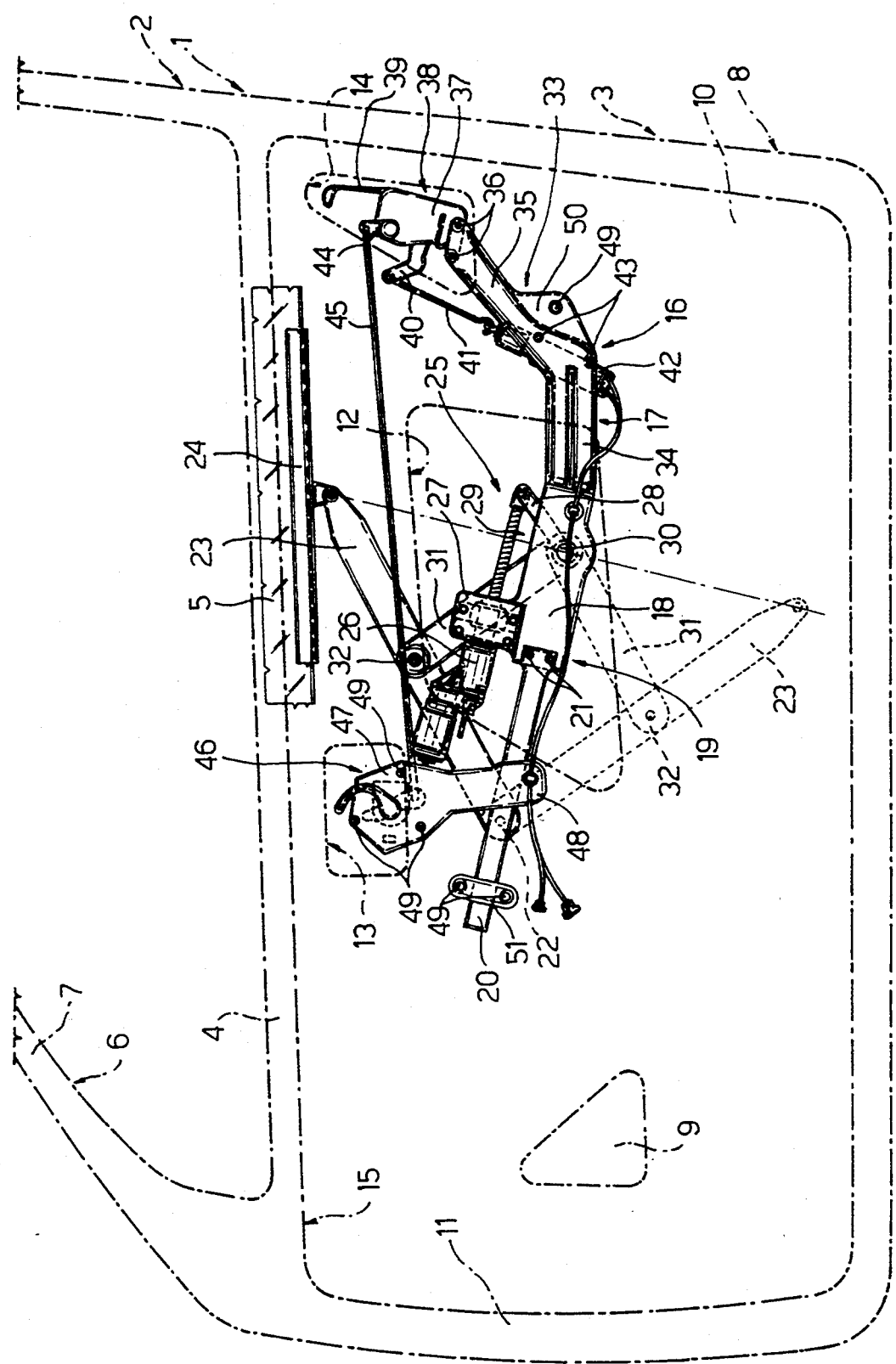

PREASSEMBLED OPERATING PANEL FOR VEHICLE DOORS

BACKGROUND OF THE INVENTION

The present invention relates to a preassembled operating panel for vehicle doors.

Vehicle doors are known to comprise an inner and outer metal sheet clinched and welded together to form a frame, the top portion of which defines a window frame fitted with a window sliding between the two sheets, and the bottom portion of which defines the frame of a box-section body comprising an inner and outer panel integral with the bottom frame. The outer panel forms the bottom portion of the outer sheet, and defines the outer shape of the door, while the inner panel forms the bottom portion of the inner sheet, and presents a number of openings through which to fit the working parts of the door (lock, window regulator, etc.) inside the gap on the box-section body. Once the working parts are assembled, the inner panel is fitted with a finish panel normally made of synthetic material and the inner surface of which normally incorporates finish components such as armrests, handles, etc.

In recent times, mainly for the purpose of speeding up on-line assembly and subsequent testing and setup, doors have been devised wherein the inner panel, formerly an integral part of the door structure, is replaced by a preassembled operating panel assembled by means of screws or similar removable fasteners, and fitted with the lock and window regulating and guide devices.

The load-bearing structure of the bottom portion of doors of the aforementioned type is thus reduced to an outer sheet, and an inner sheet clinched and welded peripherally to the outer sheet and having an opening extending over substantially the entire bottom portion of the door. On such doors, the opening formed in the inner sheet is partially closed by the operating panel connected to the inner sheet, while the inside of the door is defined as before by the finish panel.

Though widely used, known doors of the aforementioned type present several drawbacks both technically and economically. In particular, removal of substantially the entire bottom portion of the inner sheet for assembling the operating panel drastically reduces the torsional resistance of the load-bearing structure of the door, so that automated assembly and welding of the door involve the use of high-cost automatic handling solutions.

SUMMARY OF THE INVENTION

It is an object of the present invention to provide a preassembled operating panel of such shape and size as to minimize the size of the openings formed, for its assembly, through the inner sheet of the door.

According to the present invention, there is provided a preassembled operating panel for vehicle doors, the operating panel being designed for fitment to a door presenting a top opening, and a bottom portion comprising a box-section body wherein an outer panel and an inner panel define a chamber communicating externally through openings formed in the inner panel; the operating panel being designed for fitment inside the chamber, being fitted with door lock mechanisms and a device for regulating and guiding a sliding window closing the top opening, and being characterized by the fact that it comprises a central load-bearing element consisting at least partly of a portion of the window regulating device; the central load-bearing element presenting means for connecting the operating panel to the door; and the door lock mechanisms being connected to the central load-bearing element.

By virtue of a portion of the window regulating device supporting all the other working parts of the door, the shape and size of the operating panel as described above are such as to enable it to be assembled by removing only a relatively small portion of the inner sheet of the door, so that the bottom portion of the door preserves a substantially shell type structure of relatively strong torsional resistance.

BRIEF DESCRIPTION OF THE DRAWING

The present invention will be described with reference to the accompanying drawing, which shows a schematic side view, from inside, of a non-limiting embodiment.

DETAILED DESCRIPTION OF THE INVENTION

Number 1 in the accompanying drawing indicates a vehicle door comprising a top portion 2 and a bottom portion 3 separated by a substantially horizontal cross member 4 having a longitudinal opening (not shown) through which is fitted a sliding window 5.

Top portion 2 presents an opening 6 surrounded by a substantially U-shaped frame 7 having its concavity turned downwards and facing cross member 4, and which is integral with cross member 4 at the bottom end.

Bottom portion 3 of door 1 consists of a box-section body 8 defined by an outer sheet metal panel 9 and an inner preferably sheet metal panel 10, the lateral and bottom edges of which panels are connected to form a frame 11, and the top edges of which define cross member 4. Panel 9 defines the bottom outside part of door 1, while panel 10 presents a central opening 12, substantially in the form of a rectangular trapezium and the height of which is relatively small as compared with that of bottom portion 3 of door 1, and a further two openings 13 and 14 located on either side of opening 12 and adjacent to cross member 4.

Openings 12, 13 and 14 enable access from the outside to a chamber 15 defined in frame 11 by panels 9 and 10 and housing a preassembled operating panel 16 inserted, at the assembly stage, inside chamber 15 through opening 12.

Panel 16 comprises a central load-bearing element 17 defined partly by a central load-bearing bracket 18 substantially in the form of an elongated rectangle and forming part of a known so-called "compass" type window regulating device 19. Device 19 also comprises a slideway 20 extending axially from a first longitudinal end of bracket 18 and beneath opening 13, and connected to bracket 18 by screws 21; and a slide 22 mounted on slideway 20 and hinged to one end of an arm 23, the other end of which is hinged to the bottom edge of window 5 via the interposition of a connecting bracket 24. Device 19 also comprises an actuating device 25 for rotating arm 23, in relation to slide 22, between a first position (shown by the continuous line) wherein window 5 is set to the top limit position closing opening 6, and a second position (shown by the dotted line) wherein window 5 is set to the bottom limit position and opening 6 is fully open, and through an intermediate position (not shown) wherein arm 23 is aligned over slideway 20 and bracket 18.

Actuating device 25 comprises a known linear actuator 26 pivoting on a lateral appendix 27 of bracket 18 and having an axially-reciprocating output element hinged at its free end to a first arm 28 of a square rocker arm 29. Rocker arm 29 pivots centrally at 30 on bracket 18, and comprises a second arm 31 hinged at its free end to a point 32 along the center line of arm 23.

In addition to bracket 18, central element 17 also comprises a second bracket 33 connected in removable manner to the longitudinal end of bracket 18 opposite that fitted with slideway 20. According to a variation not shown, brackets 18 and 33 are integral with each other, and constitute respective portions of a single metal plate.

Bracket 33 is substantially L-shaped, and comprises a substantially horizontal bottom arm 34 constituting an extension of bracket 18; and a top arm 35 extending upwards as far as opening 14 and from the end of arm 34 opposite that connected to bracket 18.

The top end of arm 35 is connected by screws 36 to the body 37 of a known lock 38 of door 1. Lock 38 is located at opening 14, and presents a top lever 39 for connection to an outside handle (not shown); a first lock lever 40 connected by tie 41 to the output of a known electric door lock device 42 connected by screws 43 to arm 34 of bracket 33; and a second operating lever 44 connected by tie 45 to a known inside handle device 46 for operating lock 38. Handle device 46 is located at opening 13, and comprises a plate 47 having an appendix 48 connected integral with a mid point of slideway 20.

Operating panel 16 thus consists of window regulating device 19, bracket 33, lock 38, door lock device 42 and handle device 46, which combine to define a single integrated elongated element fittable inside chamber 15 through opening 12, and having fastening points 49 for assembly to door 1 formed in a central lateral appendix 50 of bracket 33, in plate 47, and in a U bolt 51 integral with slideway 20.

Door 1 as described above therefore provides for all the advantages of a preassembled, pretested operating panel, while at the same time preserving maximum torsional stability of the door, by virtue of the shape and size of operating panel 16 requiring only a small assembly opening 12 as compared with the overall size of inner panel 10 of door 1. This is also made possible by using a compass type window regulating device which, when arm 23 is set to the intermediate position, minimizes the width of operating panel 16.

I claim:

1. A preassembled operating panel for a vehicle door, the operating panel being designed for fitment to a door presenting a top opening, and a bottom portion comprising a box-section body wherein an outer panel and an inner panel define a chamber communicating externally through openings formed in the inner panel; the operating panel being designed for fitment inside the chamber, the operating panel comprising:
    a window regulating device for regulating and guiding a sliding window closing the top opening, the window regulating device having
    a central load-bearing element, a portion of the central load-bearing element defining and having formed thereby a guiding structure that define a guiding path, the central load-bearing element including means for connecting the operating panel to the door, and
    a member for supporting the sliding window, the member having a first end that is attached to and is slidably guided by the guiding structure defined by the portion of the central load-bearing element, and a second end that is operatively interconnected with the sliding window; and
    a door lock mechanism being connected to the central load-bearing element.

2. The operating panel as claimed in claim 1, wherein said central load-bearing element comprises a first bracket of the window regulating device, and a second bracket connected integral with the first bracket; the second bracket at least partly supporting said door lock mechanism.

3. The operating panel as claimed in claim 2, wherein said first and second brackets are elongated in shape; the second bracket being connected to a longitudinal end of the first bracket.

4. The operating panel as claimed in claim 3, wherein said window regulating device is a compass type, and comprises a slideaway, a slide mounted on said slideaway extending from the first bracket on the opposite side to the second bracket.

5. The operating panel as claimed in claim 1, wherein the window regulating device further includes a slide element interconnected between the first end of the member and the guiding structure defined by and formed in the portion of the central load-bearing element.

6. The operating panel as claimed in claim 5, wherein the slide element is constructed and arranged to enable the member of the window regulating device to concurrently slide along the guiding structure and pivot relative to the guiding structure.

7. The operating panel as claimed in claim 6, further including a stabilizing arm having a first end hinged to the central load-bearing element at a fixed position of the central load-bearing element, and a second end hinged to the member at a fixed position between the first and second ends of the member.

8. The operating panel as claimed in claim 7, wherein the window regulating device further includes a rocker arm having a first end coupled to the first end of the stabilizing arm, and a second end for receiving a force to actuate the stabilizing arm.

9. The operating panel as claimed in claim 1, wherein the central load-bearing element of the window regulating device further includes a support bracket having attachment points that attach to the door, the support bracket being connected to and supporting the portion of the central load-bearing element that defines and has formed thereby the guiding structure.

10. The operating panel as claimed in claim 9, wherein the support bracket is substantially L-shaped.

11. The operating panel as claimed in claim 10, wherein the portion of the central load-bearing element defining and having formed thereby the guiding structure further includes a first end have attachment points for attachment to the door, and a second end coupled to the support bracket, the guiding path of the guiding structure being parallel to a line defined by the first end and the second end of the portion of the central load-bearing element.

12. A preassembled operating panel For a vehicle door that includes an outer panel and an inner panel, the outer panel and the inner panel defining a chamber and an open top edge disposed between the outer panel and the inner panel, the inner panel having an access passage that is located remote from the top edge and defines therebetween a portion of the inner panel; the operating panel comprising:

a window regulating device that regulates a position of a window through the open top edge;

a door locking mechanism that locks the vehicle door; and a frame member that supports the window regulating device and the door locking mechanism, the frame member being constructed and arranged to pass through the access passage for attachment of the operating panel within the chamber of the vehicle door, the frame member including a first end constructed and arranged for slidably supporting a sliding arm of the window regulating device, an inner portion constructed and arranged for supporting an actuator member for leveraging the sliding arm of the window regulating device, and a second end constructed and arranged for supporting the door locking mechanism.

13. The preassembled operating panel for a vehicle door as defined in claim 12 wherein the inner portion of the frame member further comprises a first portion having a pivoting element for supporting a rocker arm, the rocker arm having a first end attached to the actuating member and a second end attached to the sliding arm of the window frame device.

14. The preassembled operating panel for a vehicle door as defined in claim 13 wherein the door locking mechanism comprises a drive member, a door lock, and a lever;

the inner portion of the frame member further comprises a second portion supporting the drive member of the door locking mechanism, and the second end of the frame member supports the door lock and the lever of the door locking mechanism.

15. The preassembled operating panel for a vehicle door as defined in claim 13 wherein the rocker arm is substantially L-shaped and, in combination with the sliding arm of the window regulating device, permits movement of a window connecting member along a substantially vertical axis.

16. The preassembled operating panel for a vehicle door as defined in claim 12 wherein the first end of the support arm includes a slideaway having a substantially horizontal axis permitting a first end of the sliding arm of the window regulating device to move in along the substantially horizontal axis.

17. The preassembled operating panel for a vehicle door as defined in claim 16 wherein the sliding arm of the window regulating device further comprises a middle region having attached thereto a rocker arm for leveraging the sliding arm, and a second end attached to a window connecting member.

18. A preassembled operating panel for a vehicle door having a chamber in the door defined at least in part by an inner panel, the inner panel having an opening therethrough for receiving the preassembled operating panel, the opening having a first end and a second end and a length extending from the first end of the second end, the operating panel comprising:

an elongated central load-bearing frame, the central load-bearing frame including a first end constructed and arranged for slidably supporting a sliding arm of window regulating device, an inner portion constructed and arranged for supporting an actuator member for leveraging the sliding arm of the window regulating device, and a second end constructed and arranged for supporting the door lock mechanism;

a door lock mechanism connected to one end of the elongated central load-bearing frame;

a window regulating device for regulating and guiding a sliding window, at least part of said window regulating device forming a part of the central load-bearing frame, the preassembled operating panel having a length greater than the length of the opening in the inner panel but insertable therethrough; and means for connecting the operating panel to the door.

19. The preassembled operating panel for a vehicle door as defined in claim 18 wherein the inner portion of the central load bearing frame further comprises a first portion having a pivoting element for supporting a rocker arm, the rocker arm having a first end attached to the actuating member and a second end attached to the sliding arm of the window regulating device.

20. The preassembled operating panel for a vehicle door as defined in claim 19 wherein the door lock mechanism comprises a drive member, a door lock, and a lever;

the inner portion of the central load bearing frame further comprises a second portion supporting the drive member of the door lock mechanism, and the second end of the central load bearing frame supports the door lock and the lever of the door lock mechanism.

21. The preassembled operating panel for a vehicle door as defined in claim 19 wherein the rocker arm is substantially L-shaped and, in combination with the sliding arm of the window regulating device, permits movement of a window connecting member along a substantially vertical axis.

22. The preassembled operating panel for a vehicle door as defined in claim 19 wherein the first end of the support arm includes a slideaway having a substantially horizontal axis permitting a first end of the sliding arm of the window regulating device to move in along the substantially horizontal axis.

23. The preassembled operating panel for a vehicle door as defined in claim 22 wherein the sliding arm of the window regulating device further comprises a middle region having attached thereto a rocker arm for leveraging the sliding arm, and a second end attached to a window connecting member.

* * * * *